Jan. 4, 1944. E. A. DAVIES 2,338,495
RADIATOR VENT VALVE
Filed Oct. 10, 1940 2 Sheets—Sheet 1
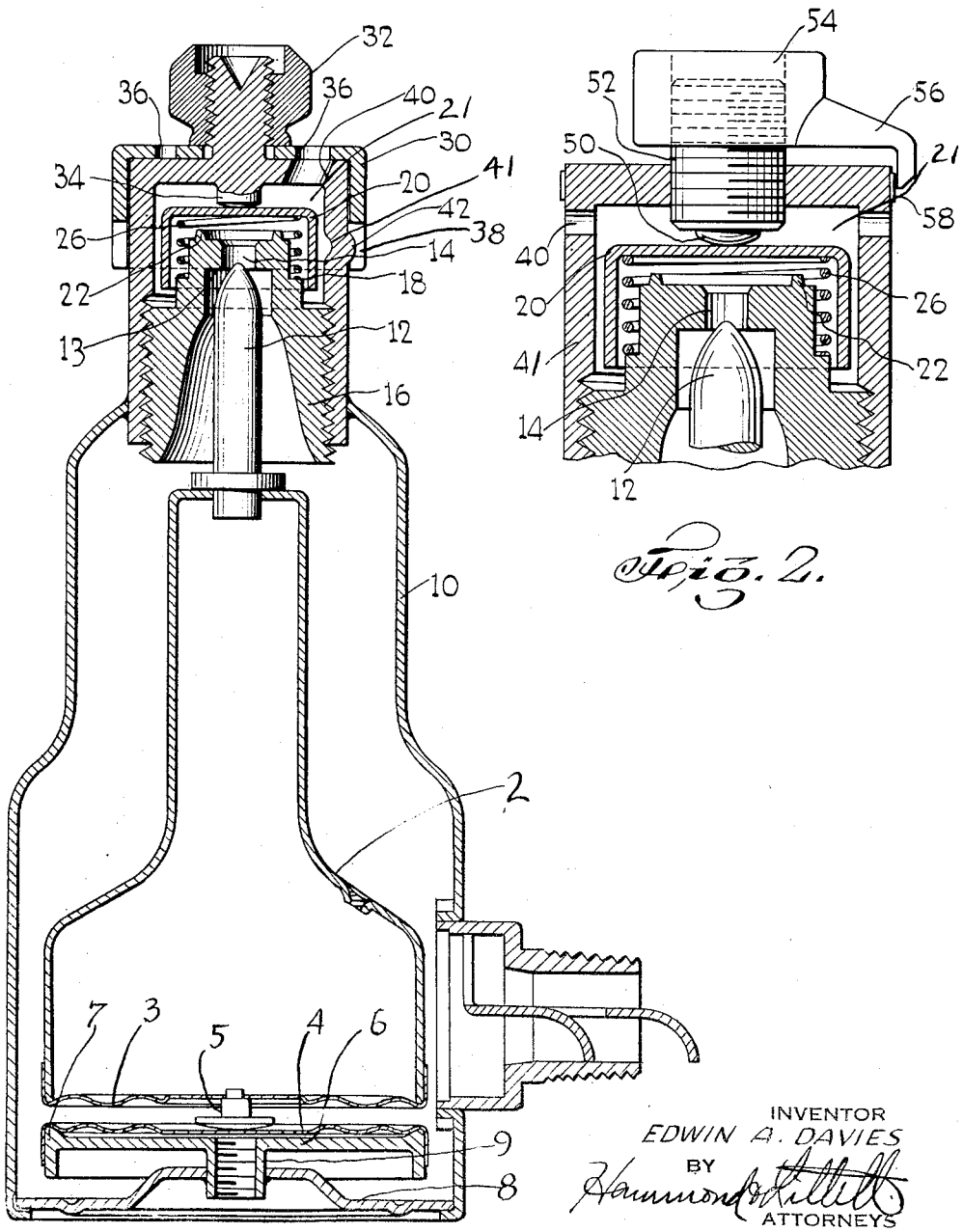
INVENTOR
EDWIN A. DAVIES
BY
ATTORNEYS Jan. 4, 1944.    E. A. DAVIES    2,338,495
RADIATOR VENT VALVE
Filed Oct. 10, 1940    2 Sheets-Sheet 2
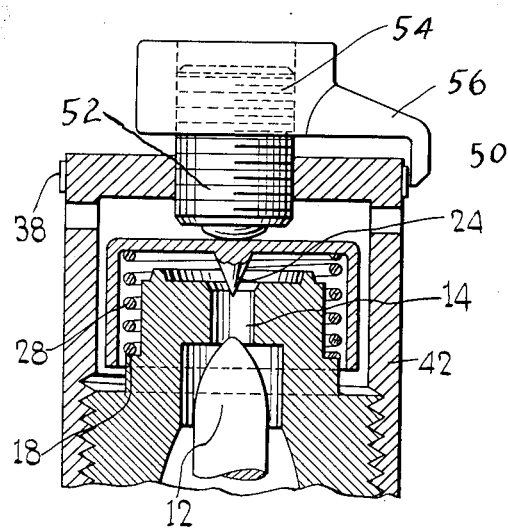
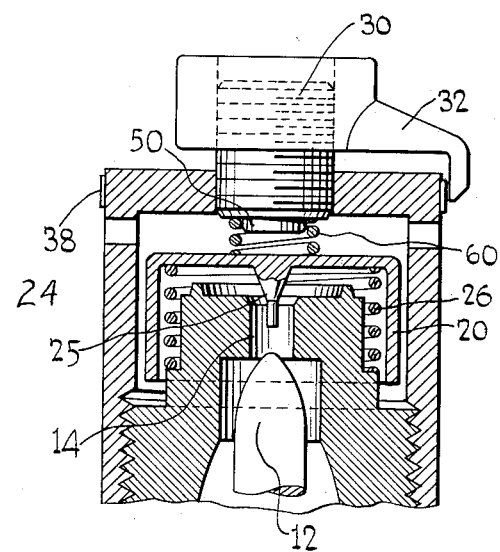
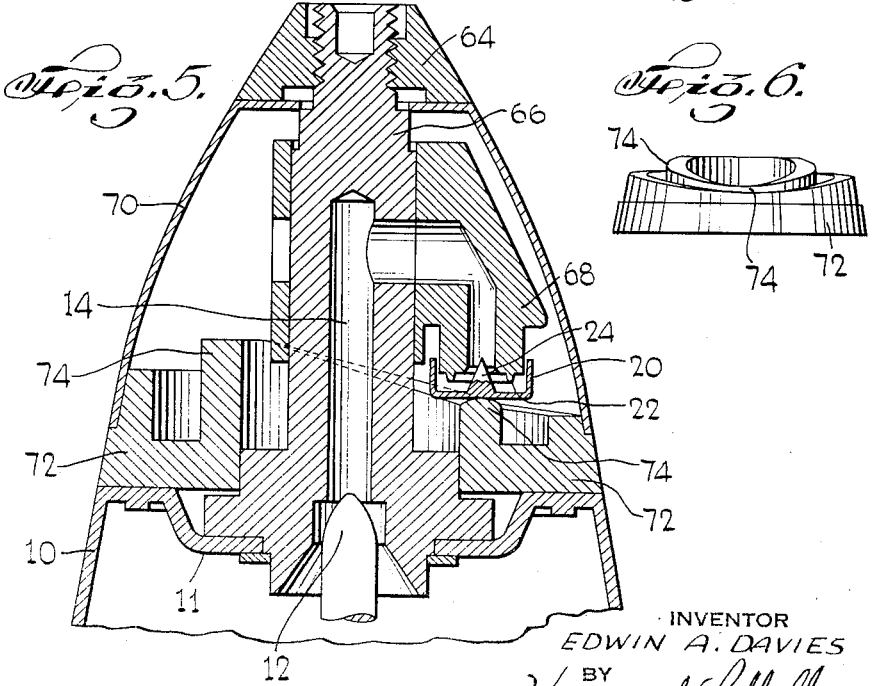
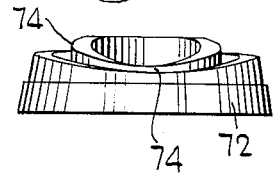
INVENTOR
EDWIN A. DAVIES
BY
ATTORNEYS Patented Jan. 4, 1944

2,338,495

UNITED STATES PATENT OFFICE 2,338,495

RADIATOR VENT VALVE

Edwin A. Davies, Glenbrook, Conn., assignor to Hoffman Specialty Co., Inc., Stamford, Conn., a corporation of Illinois Application October 10, 1940, Serial No. 360,657

7 Claims. (Cl. 236—61)

This invention relates to a valve for freely venting air from radiators of steam heating systems, and more particularly to improvements in the check valve structures of various types of radiator vent valves, for example, the type shown and described in United States Letters Patent No. 1,708,622, issued to G. D. Hoffman on April 9, 1929, and which is also applicable to other types of radiator vent valves.

In the ordinary vacuum vent valve used on either a radiator or steam main of a steam system, the check valves used make is necessary for the pressure in the system to be slightly above atmospheric pressure before the system can vent, the reason for this being that enough pressure has to build up in the system to blow the check valve off its seat. The force necessary to do this must not only be of sufficient magnitude to overcome the weight of the check, but must be augmented to overcome any sticking or adhesion of the check valve to its seat. Furthermore, the check valves provided in the ordinary vacuum vent valves are usually not adjustably mounted, thus preventing the regulation of the rate of venting by their adjustment.

It is the object of this invention to provide a free venting vacuum valve which will permit venting to take place as soon as atmospheric pressure is reached.

It is another object of this invention to provide a free venting vacuum valve which will permit venting to take place much earlier in the period when the heating system is going from vacuum to pressure, than is possible with the ordinary valves.

A further object of this invention is to provide a free venting valve which is constructed in such manner as to permit moisture present in the check valve and on the valve seat to evaporate readily when the valve is in normal position, and thus prevent such moisture from causing sticking of the check valve to its seat.

A further object of this invention is to provide a free venting valve in which the check valve is normally kept off its seat, particularly during the period in which the radiator is steam hot.

Another object of this invention is to provide a free venting valve having a check valve and a diaphragm valve for holding the vacuum, the check valve being normally kept off its seat, and cooperating with the diaphragm valve to help hold the vacuum in a steam heating system.

A further object of this invention is to provide a free venting valve with an adjustable check which can be regulated to control the rate of venting.

Other objects and advantages of this invention will become apparent from the disclosure made hereinafter.

In the accompanying drawings, which show illustrative embodiments of my invention, Figure 1 is a vertical section of a vacuum valve having the check held off its seat by means of a spring and having a cooperating vacuum diaphragm positioned in its base;

Figure 2 is a vertical section through the upper portion of another embodiment which is provided with means for regulating the size of the gap between the check and its seat when the valve is in normal position;

Figure 3 is a vertical section showing parts of a vacuum valve similar to that of Figure 2 but provided with a modified form of a check valve;

Figure 4 is a vertical section showing another modification of the valve structure of Figures 2 and 3;

Figure 5 is a vertical section through the upper portion of a vacuum valve provided with a check which is held away from its seat by the force of gravity; and Figure 6 is a perspective view showing a part of the valve structure of Figure 5.

The several illustrated embodiments of my invention include in general a vacuum valve casing 10, adapted to be connected to a steam radiator or other part of the heating system in the usual way, a vent passage 14 in the casing adapted to be put into communication with a steam system, a valve pin 12 movable by temperature, water flotation or vacuum and adapted to close the vent passage against escape of steam from the casing and entrance of air into the casing, a check valve 20 adapted to seat on a check valve seat 22 to close the vent passage and prevent the passage of air into the system through the casing, when the system is under subatmospheric pressure, means for holding the check valve 20 off its seat whenever it is not active as a seal for forming the vacuum, and means for modulating the venting rate of air into the atmosphere.

Figure 1 shows one form of a free venting vacuum valve embodying features of this invention. It includes a vacuum valve casing 10, a valve pin 12, a vent passage 14 in block 16, a check valve 20, an annular valve seat 22, a cap 30 with a regulating knob 32, a float and expansion chamber 2, and a vacuum diaphragm 4. The valve pin 12 is positioned within the casing 10 and adapted to seat on a seat 13 surrounding the vent passage 14 to prevent the escape of steam from, or entry of air into, the casing. Pin 12 is secured to the upper portion of the hollow body 2, which is both a float and an expansion chamber. This chamber contains a quantity of a volatile liquid designed to develop a specific pressure within the hollow body when heated to a given degree by the presence of steam in the valve. The lower end of the body 2 is a flexible wall or diaphragm 3 which bulges out when the expansion of the volatile liquid increases the internal pressure.

In the illustrated embodiment the wall or diaphragm 3 rests on a post 5 which in turn rests on diaphragm 4. When the diaphragm 4 is in its lowermost position, it and the post 5 are supported on a structure 6, which determines the lowermost position of diaphragm 3 and the hollow body 2. When the temperature within the valve has caused the volatile liquid within body 2 to expand and thus bulge out the bottom wall 3, the resistance of post 5 to downward movement of wall 3 will cause the hollow body 2 to move away from its lowermost position, thus causing the valve 12 to seat in its seat 13.

The diaphragm 4 is secured and hermetically sealed to a peripheral wall 7 integral with the supporting structure 6. This structure is mounted in the bottom wall 8 of casing 10 by means of a tube 9, which passes through the bottom wall 8 and admits atmospheric pressure to the underside of the diaphragm 4. It will be evident, however, that atmospheric pressure so admitted is confined to the underside of diaphragm 4 and is not otherwise admitted into casing 10. When the upper side of the diaphragm 4 is exposed to subatmospheric pressure conditions within the valve casing, the diaphragm will be bulged upwardly by atmospheric pressure exerted on its underside. In such cases the bulging diaphragm will cause the post 5 to press upwardly against the bottom wall of the hollow body 2, causing the entire body to move upwardly until the valve 12 is pushed into its seat to hold vacuum. The support 6, in addition to limiting downward movement of diaphragm 4 and post 5, also protects the sensitive flexible diaphragm 4 from injury in case of severe steam pressure on its upper side.

In the embodiment illustrated in Fig. 1 the check valve 20 is cap-like in shape, and is held off its seat 22 by spring 26 which abuts the underside of the cap at one end and rests on shoulder 18 of block 16 at the other end. The spring pushes the top of check valve 20 into engagement with a stop such as 34 which limits the movement of the check 20 and thereby determines the degree of vacuum necessary to close the valve. The check valve 20 works in a chamber 21 defined by the upper part of an enclosure 41 which is threaded on block 16 at its lower end and from the top of which extends the stop 34. As steam condenses after a heating period to form a vacuum in the system, air is taken into the system through the air vent passage 14 by way of a port 40 in enclosure 41 and the gap between the check valve and the annular valve seat 22. When the pressure difference is sufficient to overcome the force of spring 26, which in preferred embodiments may be about .5 to .6 inch of mercury, the check valve 20 will be moved into engagement with its seat 22 and will thus prevent further flow of air into the system, permitting the vacuum to build up rapidly to the point necessary to cause the vacuum diaphragm 4 to actuate the valve pin 12 and push it into its seat 13. In preferred embodiments, the diaphragm 4 is operative to seat the pin at 3 to 3½ inches of mercury. When the pin is seated the vacuum will thus be preserved until the next heating period. After the valve 12 has seated, the vacuum in the passage 14 soon decreases to such an extent as to be less than the force, for example, .5 or .6 inch of mercury, necessary to overcome the force of the spring 26, thus permitting the spring to lift and keep the check valve off its seat until it is again needed to build up the preliminary vacuum necessary for rapid closing of valve 12 through the action of the vacuum diaphragm 4. It is naturally understood that the spring 26 and diaphragm 4 can be constructed so as to become operative at pressures other than those given as illustrative of preferred embodiments. These pressures may vary over a wide range.

The check valve illustrated in Fig. 1 may also be used in valves which are not provided with vacuum diaphragms. In such cases the check valve would continue to preserve the vacuum and would not be relieved by the seating of valve 12 by the actuation of the vacuum diaphragm 2. In such case when the system goes to pressure, that is, when heat is called for, spring 26 will force the check valve 20 off its seat as soon as atmospheric pressure is reached or slightly before such pressure is reached, thus permitting quick venting of air in the system through vent passage 14 and the gap between the check valve and the check valve seat while the steam is coming into the radiators.

In order to be able to adjust the speed of venting through check valve 20 the vacuum valve structure may be provided with means for adjusting the outlet from chamber 21 so as to restrict the flow of air to the atmosphere. For example, the enclosure 41 may be surmounted by a cap 30, such as illustrated in Figure 1, which is provided with ports 36 of varying sizes. This cap can be mounted in such manner that any of its ports 36 may be turned to register with port 40, thereby controlling the speed of venting. The cap 30 may be held in any selected position by suitable means such as a nib 42 on member 41, cooperating with recesses 38 formed in the skirt of cap 30. By thus providing each valve with a variable vent it becomes possible to regulate the valves on several different radiators in a common heating system so that all of the radiators will be vented and will become thoroughly heated in substantially the same period of time. It is also possible thereby to vent several radiators selectively so that steam will enter a radiator positioned close to the boiler at a rate which is no more rapid than that at which the steam is supplied to a radiator farther removed from the boiler.

Fig. 2 shows a free venting vacuum valve similar to that illustrated in Fig. 1, the main difference being that the spring 26, instead of forcing the check valve 20 against a permanent stop, such as 34 of Fig. 1, forces the check valve against an adjustable or retractable stop 50. By means of this retractable stop the distance which the check valve 20 can be elevated from its seat 22 by means of the spring 26 may be adjusted at will by manipulating screw 52 controlled by the knob 54. The setting of the knob is indicated by an indicator 56 projecting from the knob, which indicator registers with a scale 58 around the top of the enclosure 41. In this embodiment, the valve port 40 leads directly to the atmosphere and need not be subject to adjustment. When using this modification the speed of venting is controlled by modifying the size of the gap between the check valve 20 and the valve seat 22. Modulation of the venting rate by the means illustrated in this figure possesses many advantages over the type illustrated in Fig. 1. One of the most important advantages resides in the fact that when the modulation of venting rate depends upon variation of the size of the outlet from chamber 21, it is sometimes difficult to obtain a sufficiently great pressure drop within the valve to force the check valve 20 into seating engagement with its seat 22 when the vacuum is created. This difficulty, when it arises, is normally caused by the fact that when only a small venting outlet is available a large pressure drop may occur at the outlet, and this may be so great as to detrimentally influence the pressure drop between the check valve and the remainder of the system. However, if the port leading to the atmosphere is relatively large and always remains the same, any increase in pressure drop that may occur due to a reduction of the space between the check valve and its seat, because of a manipulation of the screw 52, occurs at the gap between the check valve 20 and its seat 22 and thus the pressure drop or the force available to close this check valve is not affected.

The embodiment illustrated in Fig. 3 is similar to that illustrated in Fig. 2, except for the construction of the check valve 20. In Fig. 2 the modulation or variation in venting speed is obtained by moving the flat disk-like check valve closer to its seat 22. Such modulation of the distance between the flat disk and the annular edges of the valve seat, however, does not permit a very close regualtion, as a small motion in either direction increases or decreases the area of the gap very rapidly. This difficulty may be largely overcome, and a sensitive adjustment obtained, by use of a check valve such as illustarted in Fig. 3, wherein the disk-like body of the valve 20 is provided with a cone 24 which extends into the vent passage 14 but not far enough to interfere with the valve 12 when the latter is seated in its seat 13. The cone 24 at its base is preferably of a diameter smaller than the diameter of the port 14, so that it never can shut the valve off nor become jammed in the vent passage 14. The use of this cone permits a closer regulation of the vent passage to be accomplished, because the variation in the area of the vent passage, for a considerable movement of the check valve, is slight in comparison with the variation caused by a corresponding movement of a flat disk such as is shown in Fig. 2. The final closing of the check valve is still preferably accomplished by the flat surface of the check valve 20 seating upon the annular seat 22.

Fig. 4 illustrates another modification of a portion of a free venting vacuum valve embodying the features of my invention. This embodiment also is similar to the embodiments already described, particularly Fig. 3. The modulating cone 24, however, is elongated to form an extension pin 25, of such length as to contact the tip of the valve pin 12 and prevent the check valve 20 from resting on its seat 22 when the valve pin 12 is in seating relationship with its seat 13. This contact of the extension pin 25 with the end of valve pin 12 will lift the check valve 20 off its seat and keep it off during the entire period that the valve pin 12 is closed or on its seat. The contact of the valve pin 12 with the extension pin 25 will also forcibly dislodge the check valve 20 from its closed position in case it has become stuck and is not dislodged by the pressure of spring 26. In place of a directly abutting stop of the kind shown at 50 in Figure 3, it has been found advantageous, when using a check valve of this type, to use an adjustable stop means which includes a bumper spring 60. This spring is preferably very light and must not contact the check valve 20 when the latter is on its seat, in order that the movement of the valve 20 from its seat may be easily effected.

Fig. 5 shows the upper portion of another modification of a vacuum valve embodying features of this invention. In this modification the air vent passage 14 is U-shaped with the legs projecting downwardly. This permits the check valve 20 to be held away from its annular seat 22 by the force of gravity. In the illustrated embodiment the block 66 and supplementary block 68 are keyed to one another and fixed to shoulder 11 of casing 10. A vented cap 70 encircles the major portion of block 66 and supplementary block 68, and is attached to block 66. Block 72 surrounds block 66 and is rotatable around it except when head nut 64 is tightened, thereby clamping block 72 between cap 70 and casing 10. Block 72 is provided with an annular cam-like rib 74 on which the check valve 20 rests when the pressure in the system is not subatmospheric. The gap between annular seat 22 and the check valve 20 of this embodiment of the invention can be modulated by rotation of the block 72, moving the cam-like rib 74 to cause the valve 20 to approach or move away from the valve seat 22. This increases or decreases the size of the venting port. In other respects the valve illustrated in the embodiment of this invention operates in the same manner as those previously discussed, that is, in those cases in which the pressure in the system is atmospheric or more than atmospheric and the temperature in the casing is not sufficient to cause the valve pin 12 to close the vent passage by engaging seat 13, the air passes through the U-shaped vent passage and out through the gap between the check valve 20 and the valve seat 22 and through the vents in the cap 70. When, on the other hand, a vacuum is being formed in the system and the pressure drop becomes sufficient, the outside pressure will force the check valve 20 into engagement with its seat 22 and thus hold the vacuum in the system, until heat is again called for.

While preferred embodiments of the venting vacuum valves have been illustrated and described, it will be readily understood that the principles of construction herein described can be embodied in other forms of vacuum valves, and that variations in the specific forms herein illustrated can be made without departing from the spirit of my invention or the scope of the claims appended hereto.

I claim:

1. In an air venting device for a steam heating system, including a valve body having a vent passage to conduct air out of and into the system and inner and outer pressure-responsive valve means to control the air flow through said passage, outer valve means comprising a valve seat on said body around the outer end of said passage, a check valve for said seat constantly biased by a predetermined force toward a normal unseated position opening said outer end and responsive to the development of subatmospheric pressure within said passage to become seated against said force and thus to close said outer end, and adjustable means for changing the unseated position of said check valve to control the rate of venting through said passage.

2. In an air venting device for a steam heating system, including a valve body having a vent passage to conduct air into and out of the system, a valve seat at the outer end of said passage and a check valve cooperating with said seat, spring means constantly urging said valve to a venting position in definite spaced relation to said seat, said valve being responsive to the development of subatmospheric pressure within the system to become seated and thus close the outer end of said passage, and means operative after the seating of said check valve, in response to a further development of such subatmospheric pressure, for closing the inner end of said passage and thereby allowing said check valve to be returned by said spring to its venting position.

3. In an air venting device for a steam heating system, including a valve body having a vent passage to conduct air into and out of the system, a valve seat at the outer end of said passage and a check valve cooperating with said seat, spring means constantly urging said valve to a normal venting position in spaced relation to said seat, said valve being responsive to the development of subatmospheric pressure within the system to become seated and thus close the outer end of said passage, means operative after the seating of said check valve, in response to a further development of such subatmospheric pressure, for closing the inner end of said passage, and means operated by the closing movement of the last-recited means for forcibly lifting said check valve from said seat.

4. In an air venting device for a steam heating system, including a valve body having a vent passage to conduct air into and out of the system and a valve seat at the outer end of said passage, a check valve cooperating with said seat and movable between a seated position closing said outer end and a venting position in spaced relation to said seat, spring means constantly urging the check valve to said venting position and yieldable to allow closing movement of the check valve when the pressure within the passage becomes subatmospheric, and externally adjustable means for changing the distance between the seated position and the venting position of said check valve.

5. In an air venting device for a steam heating system, including a valve body having a portion defining a vent passage to conduct air into and out of the system, with an annular valve seat at the outer end of said passage, and check valve means cooperating with said seat to assist in the creation of subatmospheric pressure within the system, a check valve in the form of a cap having a top overlying said seat and an annular side wall surrounding said seat, a stop in predetermined spaced relation to said seat to limit the movement of said check valve between a closed position on said seat and a venting position abutting against said stop, and a compression spring surrounding said seat and engaging said check valve to hold the valve normally in said venting position, said spring being yieldable under a predetermined force such that the check valve is moved by atmospheric pressure to said closed position as the pressure within said passage becomes subatmospheric.

6. In an air venting device for a steam heating system, including a valve body having a portion defining a vent passage to conduct air into and out of the system, with an annular valve seat at the outer end of said passage, and check valve means cooperating with said seat to assist in the creation of subatmospheric pressure within the system, a check valve in the form of a cap having a top overlying said seat and an annular side wall surrounding said seat, a stop in predetermined spaced relation to said seat to limit the movement of said check valve between a closed position on said seat and a venting position abutting against said stop, said check valve being constantly biased to said venting position by a predetermined force such that the valve rests normally against said stop but moves to said closed position against said force as subatmospheric pressure develops within said passage, and means connected with said stop for adjusting the spacing thereof with respect to said seat.

7. In an air venting device for a steam heating system, including a valve body having a portion defining a vent passage to conduct air into and out of the system, with an annular valve seat at the outer end of said passage, and check valve means cooperating with said seat to assist in the creation of subatmospheric pressure within the system, a check valve in the form of a cap having a top overlying said seat and an annular side wall surrounding said seat, a stop in predetermined spaced relation to said seat to limit the movement of said check valve between a closed position on said seat and a venting position abutting against said stop, and a compression spring surrounding said seat and engaging said check valve to hold the valve normally in said venting position, said spring being yieldable under a predetermined force such that the check valve is moved by atmospheric pressure to said closed position as the pressure within said passage becomes subatmospheric, adjustable means connected with said stop for adjusting the spacing thereof with respect to said seat, and indicating means associated with said adjustable means for visually indicating the size of gap between said seat and said check valve for each adjustment of said stop.

EDWIN A. DAVIES.